United States Patent [19]
Nickles

[11] Patent Number: 6,134,591
[45] Date of Patent: *Oct. 17, 2000

[54] NETWORK SECURITY AND INTEGRATION METHOD AND SYSTEM

[75] Inventor: Alfred E. Nickles, Duluth, Ga.

[73] Assignee: Client/Server Technologies, Inc., Alpharetta, Ga.

[*] Notice: This patent issued on a continued prosecution application filed under 37 CFR 1.53(d), and is subject to the twenty year patent term provisions of 35 U.S.C. 154(a)(2).

[21] Appl. No.: 08/878,279

[22] Filed: Jun. 18, 1997

[51] Int. Cl.$^7$ .................................................. G06F 15/16
[52] U.S. Cl. .......................... 709/229; 709/225; 709/217
[58] Field of Search .................. 395/200.47, 200.49, 395/200.56, 200.59, 187.01, 186; 709/203, 204, 205, 217, 219, 225, 229, 230, 246, 206; 380/21–25, 29, 30; 713/200, 202

[56] References Cited

U.S. PATENT DOCUMENTS

| | | | |
|---|---|---|---|
| 4,672,572 | 6/1987 | Alsberg | 380/23 |
| 5,649,185 | 7/1997 | Antognini et al. | 395/609 |
| 5,721,779 | 2/1998 | Funk | 380/23 |
| 5,727,145 | 3/1998 | Nessett et al. | 395/186 |
| 5,805,801 | 9/1998 | Holloway et al. | 395/187.01 |
| 5,812,819 | 9/1998 | Rodwin et al. | 395/500 |
| 5,828,833 | 10/1998 | Belville et al. | 395/187.01 |
| 5,838,916 | 11/1998 | Domenikos et al. | 709/219 |
| 5,850,442 | 12/1998 | Muftic | 380/21 |
| 5,867,647 | 2/1999 | Haigh et al. | 395/186 |
| 5,870,473 | 2/1999 | Boesch et al. | 380/25 |
| 5,978,918 | 11/1999 | Scholnick et al. | 713/201 |
| 6,026,379 | 2/2000 | Haller et al. | 705/34 |

OTHER PUBLICATIONS

Diffie et al. "Privacy and Authentication: An Introduction to Cryptography", Proceedings of the IEEE, vol. 67, No. 3, Mar. 1979.

Neuman et al. "Kerberos: An Authentication Service for Computer Networks", IEEE Communications Magazine, pp. 33–38, Sep. 1994.

*Primary Examiner*—Mehmet B. Geckil
*Attorney, Agent, or Firm*—Morris, Manning & Martin, LLP

[57] ABSTRACT

A method of the present invention includes a network security system that has a single point of access control to a source computer system. The network security system provides various mechanisms for securing access to a source computer systems that includes generating single-use encryption keys, generating random port assignments for communication between devices, an asynchronous message protocol used in the security system and utilizing various levels of transaction tables to help secure and manage security parameters of the system. More particularly, the present invention provides a method for securing access to a plurality of computers connected via a network. An indication is received that a first user of a first computer program module desires to communicate with a destination computer system. When this indication is received, a message is directed to a security computer system. The security computer system determines whether the first user is authorized to access the destination computer program module of the destination computer system. If the security computer system determines that the first user is authorized to access the destination computer system, the security computer system sets up a communication protocol between the first computer program module and the second computer program module.

20 Claims, 10 Drawing Sheets

| | | MESSAGES | | | |
|---|---|---|---|---|---|
| FIELD | SAMPLE | ① | ② | ③ ⑤ ⑥ | ④ |
| FROMNODE | 129.37.64.29 | 1 | 1 | 1 | 1 |
| FROMTIME | 76554345 | 2 | 2 | 2 | 2 |
| FROMCODEPAGE | ASCII/EDEBIC | 3 | 3 | 3 | 3 |
| FROMBYTEORDERING | BIG/LITTLE (1) | 4 | 4 | 4 | 4 |
| FROMPLATFORM | UNIX | 5 | 5 | 5 | 5 |
| FROMDATAMODE | ASCII/BINARY | 6 | 6 | 6 | 6 |
| PASSWORD | UDEMP 1 LL* | 7 | 7 | 7 | 7 |
| LOGOPTION | 1111 | 8 | 8 | 8 | 8 |
| DEBUGOPTION | 2222 | 9 | 9 | 9 | 9 |
| USERNAME | CST0 | 10 | | | |
| USERPASSWORD | ABC | 11 | | | |
| USERID | 21 | | 10 | | 10 |
| SEQUENCENO | 15 | | 11 | | 11 |
| OBJECT | 123 | 12 | 12 | | 12 |
| PUBLICKEY | SDFGEE71 | | 13 | 10 | 13 |
| TARGETSOCKET | 4567 | | 14 | | 14 |
| TARGETADDRESS | 129.37.64.38 | | 15 | | 15 |
| RETURNCODE | 99 | | 16 | 11 | 17 |
| GATEWAYDATA | EOD | 13 | 17 | | |
| | LENGTH | 13 | 17 | | |
| | DATA | 13 | 17 | | |
| OBJECT DATA | EOD/EOR | | 18 | 12-N | 18-N |
| | LENGTH | | 18 | 12-N | 18-N |
| | DATA | | 18 | 12-N | 18-N |
| END | EOM | 14 | 19 | 13 | 19 |

FIG.11

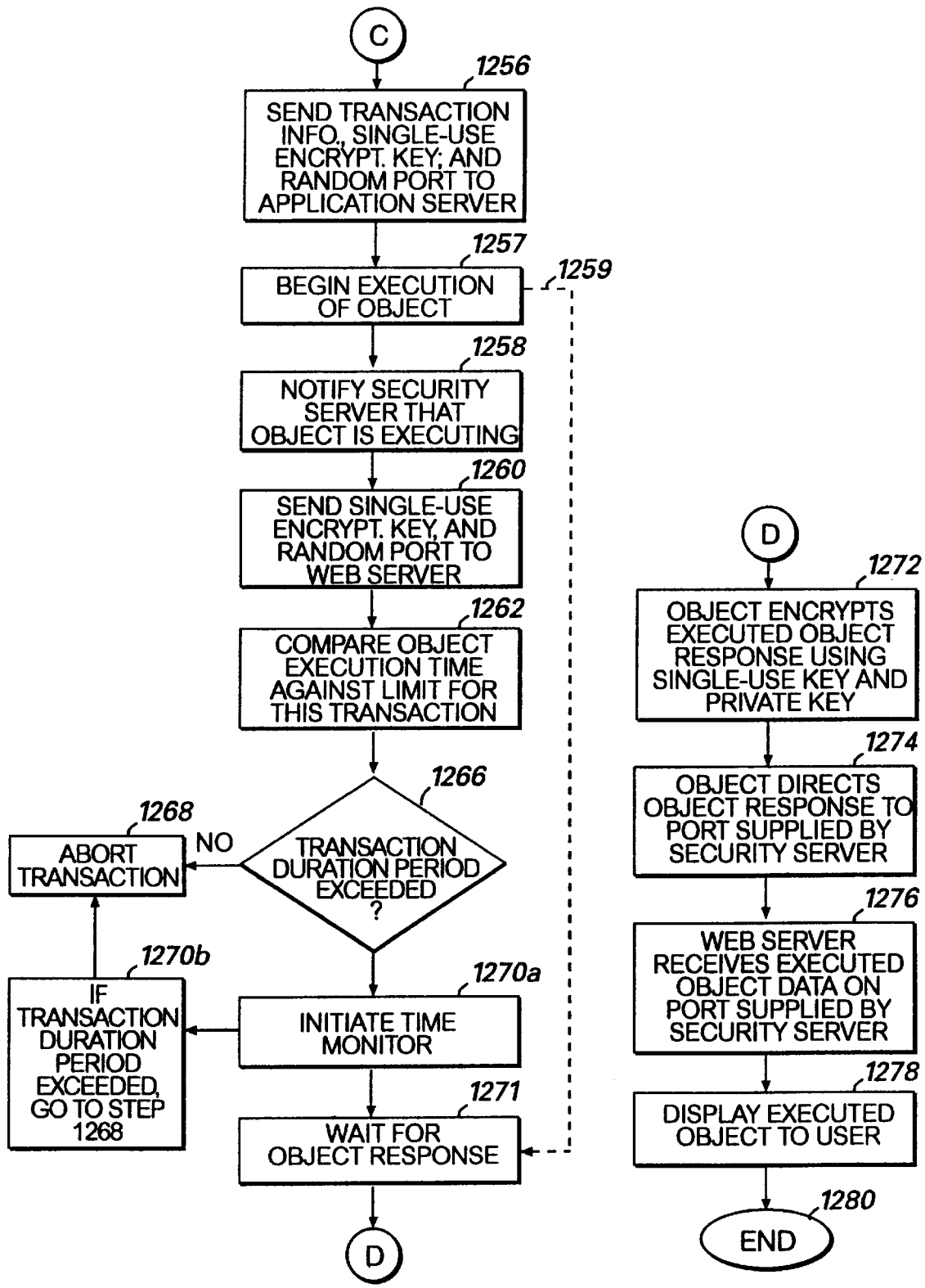
FIG.12D   FIG.12E

NETWORK SECURITY AND INTEGRATION METHOD AND SYSTEM

FIELD OF THE INVENTION

The present invention relates to security systems for computer networks and to integrating security systems with an existing network.

BACKGROUND OF THE INVENTION

Computer use and the electronic transfer of information has increased substantially among home and business computer users. The growth in computer use has spurred a demand for creating computer networks to facilitate the transfer and sharing of information. For example, many companies provide computers for most, if not all employees, to facilitate the exchange of information among the employees via a computer network. Many companies have reduced cost associated with computing by adopting client/server networks to aid in the transfer of information between company computer systems. Networks within a business are often referred to as local area networks (LANs). A local area network is a group of computers and other devices disbursed over a relatively limited area and connected by a communications link that enables any device to interact with any other on the network. LANs often include microcomputers, mainframe computers and shared resources such as printers and hard disks. Many LANs can support a wide variety of computers and other devices. The devices connected to the LAN must use the proper physical and data-link protocols for the particular LAN, and all devices that communicate with each other use the same upper-level communications protocol.

By using client/server networks, companies consolidated many of their computer processing applications, databases or needs in a central computer processing center. With a central computer processing center containing most if not all the computer programs and databases of the company, programs that provide scheduling, inventory monitoring, order placement, account processing, or data exchange processing necessary for efficient management of the business may be readily obtained by a distributed group of workers. By providing a centralized operating environment with company records and programs, employees of large companies have access to and know of transactions being carried out or performed by other employees at the office although the employees may be located in different office buildings or different floors of the company. Therefore, several employees can work independently of each other to schedule customer appointments, take orders, process accounts and have the data records of the company updated in a centralized facility so as to avoid duplicative or conflicting actions.

As computer use and network use has increased in companies, so to has computer use and network use increased among individual home users. While these home users do not generally set up a special network to communicate with other home users, the home computer users, as well as businesses, can gain access to a global computer (wide area) network often referred to as the Internet. By gaining access to the Internet, all types of computer users may be connected.

Because many companies are aware of the growth of computer use in most environments, these companies seek to reach these users or potential customers through a computer network, which is most often the Internet computer network. Many companies reach the potential customers by providing one of several different types of methods of communicating over the network. For example, a business may provide a graphic advertisement over a computer network, an interactive request system to a special database set up for user interaction, or an interactive processing system that enables a customer to interact with a company's internal computer network. Companies usually desire to enable customers to access the internal company network to perform simple important tasks that reduce company overhead, such as processing banking account information or room scheduling for a hotel.

Although providing access to a company network and systems is desirable in many situations, it is not always practical for several reasons. For example, the internal networks of companies often contain confidential data such as inventory data, customers accounts, price structuring information, business leads and plans, and other business critical data. While this type data may not be generally accessed by customers, some customers or users may be skilled in defeating general security measures of computer systems and may access the confidential information. Computer users who attempt to compromise computer security systems are often referred to as computer hackers or crackers. Therefore, security concerns often can make access to a company's network risky or impractical. Additionally, many companies have invested from several thousand to millions of dollars on computer systems that incorporate mainframe/legacy systems. These mainframe/legacy systems are often specially designed for the business to process information quickly and efficiently in the business' environment. However, these legacy systems are not readily adaptable to interact directly with public networks such as the Internet to facilitate customers use. Particularly, the messaging systems of these legacy systems are not adapted to interact efficiently with the Internet public network. Furthermore, because legacy systems are custom designed systems, it can be a difficult task for a manager of the system to continually update the programming of the system to allow customers to access new or updated systems on the network and to account for a changing customer base.

With respect to the security of systems, many companies use a computer protection device, known as a firewall, in association with the company computer server that provides access to the Internet. A firewall is a device located on the Internet that examines the information in a header of a data communication and blocks entry if the header information contains or does not contain certain information. An experienced computer hacker can monitor Internet traffic and obtain the node address of an authorized or trusted user of the company's computer system then fake the address to obtain access to the company's computer system. A firewall does not prevent such deception. Current firewall technology provides limited protection against professional hackers. Additionally, firewalls only provide protection measures for information contained in headers and header information only contains standardized information as promulgated by a standards committee for Internet protocol. Due to the standardized nature of headers, firewalls do not provide flexible security options. Because the firewall is an Internet device, once this Internet security measure is broken the companies records are exposed to the computer hacker.

Thus, there is a need for a security system that enables a private network of computers to be accessible via an open network and that provides a higher level of security than that afforded by firewalls. Additionally, there is a need in the art for a network security system that enables a private computer network that incorporates specialized computer systems to be used in connection with an open network without substantial modification to the specialized computer systems. Furthermore, there is a need for a network security system that may be easily managed by a network security manager.

SUMMARY OF THE INVENTION

Generally described, the present invention provides a network security system that provides a single point of access control to one or many source computer systems. The present invention provides various mechanisms for securing access to source computer systems that includes generating single-use encryption keys, generating random port assignments for communication between devices, using an asynchronous messaging protocol in the security system and utilizing various levels of transaction tables to help secure and manage security parameters of the system.

More particularly described, the present invention provides a method for securing access to a plurality of computers connected via a network. In this method, an indication is received that a first user of a first computer program module desires to communicate with a source computer system over the network. When this indication is received, a message is directed to a security computer system. The security computer system, functioning as an access control manager to the source computer system, determines whether the first user is authorized to access the source computer system. If the security computer system determines that the first user is authorized to access the source computer system, the security computer system sets up a communication protocol between the first computer program module and the second computer program module.

Additionally, the communication protocol that is set up between the first computer program module and the source computer system may be terminated if a selected time period is exceeded. Also, setting up the communication protocol may include selecting, in response to the step of receiving the electronic communication, one port of the multiple ports of the source computer system to be used for communication of information over the computer network between the first computer program module and source computer system. The first computer program module communicates with the source computer system via the selected one port and the source computer system communicates with the first computer program module via the one port. The one port is preferably selected by a randomizing selection program module. The port may be changed for each transaction by the randomizing routine.

Another method of the security system may include providing encryption keys to a first computer program module and a second computer program module where each program module is stored in a computer system. One step of the method includes receiving a message that is to be encrypted. In another step, a message specific encryption key is generated in response to receipt of the message. The message specific encryption key is transmitted to the first and the second computer program modules. The first and second computer program modules are operative to use the message specific encryption key to encrypt or decrypt a message transmitted between the first and second computer program modules. Message specific encryption keys are preferably single-use encryption keys that are newly generated for each message transaction that is to occur.

Another computer-implemented method of the present invention includes authenticating and granting access privileges to a user of a first computer system who wants to communicate with a source computer program module. An indication is received that a first user of the first computer program module desires to communicate with a source computer system. In response to the indication, digital signatures are used to authenticate that the request was received from a trusted user. Next, a first set of tables is accessed that contains identification information which indicates whether computer users have access privileges to the source computer system, or systems, being managed by the security system. Next, a second set of tables is accessed to determine whether the requested source computer module exists, and is known to the security system. The second set of tables identify the source computer program modules available for access on the second computer system, or systems, being managed by the security system. Next, a third set of tables is accessed that specify whether the first user has access privileges to the indicated source computer program module. The third set of tables identify the source computer modules to which specific users have access. Finally, a fourth set of tables is accessed to determine if the requested system is available (on-line), and to provide addressing information for the source computer. Following these steps, the user is enabled to access the indicated source computer module from the first computer program module if the user is authorized to access the source computer system, if the identified source computer program module is contained in the second set of tables, if the identified source computer program module is contained in the second set of tables, if the third set of tables indicate that the user has access privileges to the indicated source computer program module, and if the source computer is operational (on-line).

BRIEF DESCRIPTION OF THE DRAWINGS

FIG. 11 is a diagram of a representative message format used in connection with the preferred embodiment of the present invention.

FIGS. 12*a*, 12*b*, 12*c*, 12*d*, and 12*e* are flow diagrams of the processes of the present invention.

DETAILED DESCRIPTION OF THE INVENTION

Figure 1:
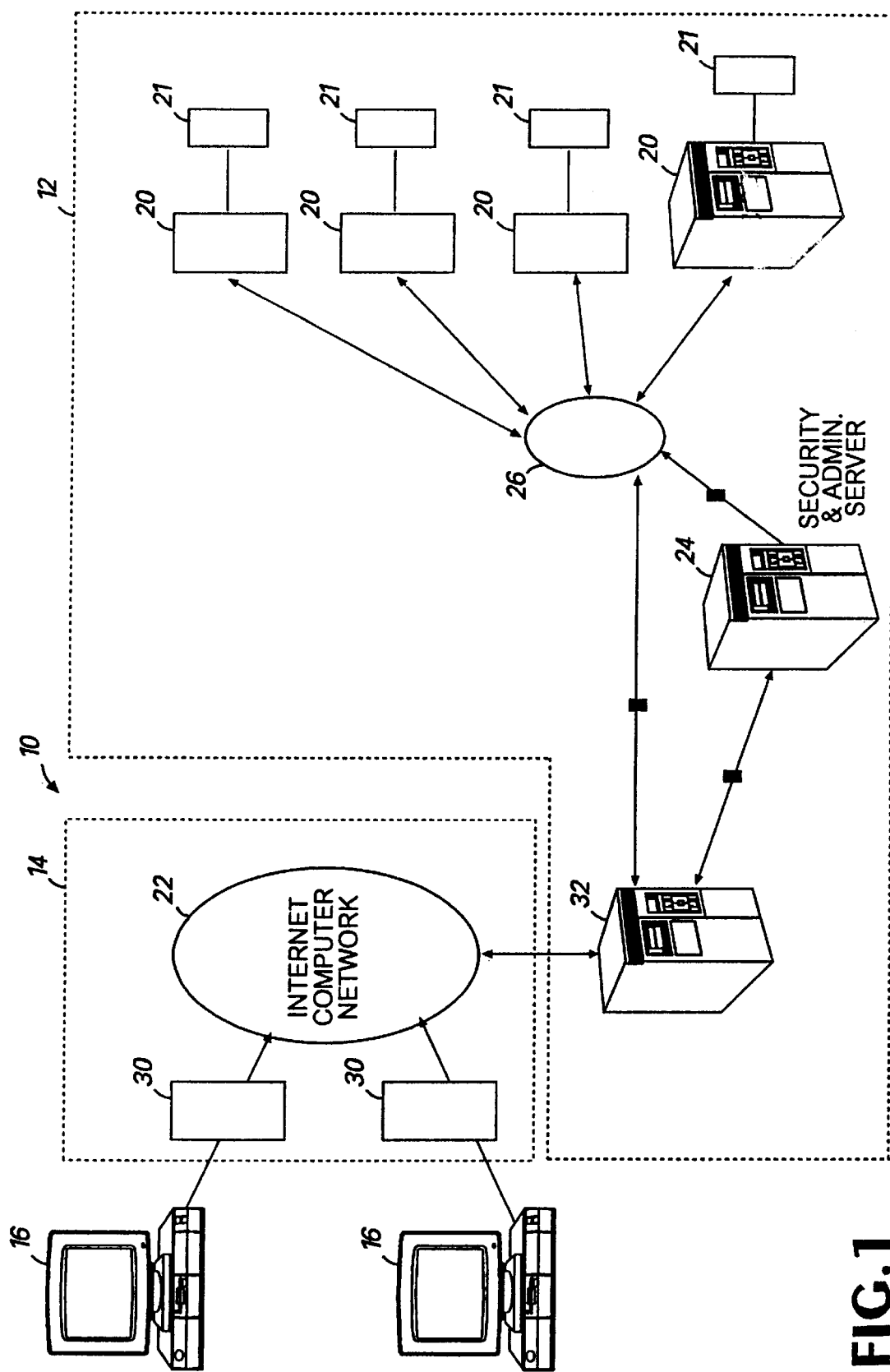
FIG. 1 is diagram of the network components used in connection with the preferred embodiment of the network security system.

Referring now to the drawings, FIG. 1 illustrates the basic components of a network security system 10 as used in connection with the preferred embodiment of the present invention. The network security system 10 of the present invention may serve to integrate devices not designed for use with the protocols of a particular network. Particularly, the network security and integration system of the present invention enables a private network 12 of computers associated with a particular entity, such as a bank, to be integrated with an open network 14 while ensuring that transactions over the open network 14 to the private network 12 of computers is secure. The network security system 10 helps to secure transactions on the private network of computers by using a single point of access control to the private network. The single point of access control to the private network is preferably implemented as a network security server. Particularly, the system of the present invention utilizes a network security server to authorize and set-up communication between two computer program communication modules.

The network security server ensures that a user seeking access to a source or destination computer system is an authorized user. The network security server also uses encryption techniques to help ensure the confidentiality of messages being delivered. The network security server operates to set-up and secure the communication channel between the two computer systems using a unique messaging protocol. More specifically, the network security server generates single-use public transaction encryption keys for each transaction that is to be performed by a user or users. The network security server delivers the single-use public key to each of the communicating systems. This key is then used by the two communicating systems for encrypting or decrypting messages delivered between the systems for the particular transaction. By generating a single-use public key for each transaction to take place, the security of the system is much more difficult to be compromised because a hacker could not readily discover a continually changing public encryption key. Even if a single-use key was discovered or guessed for one transaction, the key would be different for the next transaction.

The network security system 10 further enhances security by generating random port assignments on which communications between the two computer systems are to take place. The network security server delivers the randomly generated port assignment to each of the computer systems so that when a communication is to be made between the systems, each of the systems knows the port on which the communication is to take place. By using a port selection randomizing routine, a computer hacker cannot monitor or mimic a single port in which communications are to occur to obtain confidential data or to corrupt data because the port assignments for the data being accessed is changed with each transaction. Randomizing port assignments for each transaction in combination with generating a single-use public key for each transaction, provides a significant level of security beyond conventional network computer systems.

Conventional computer security systems limit access to a particular system by requiring a password, user id, predetermined node addresses and specific protocols. However, in addition to these measures, the network security system described herein is enabled to limit access of an authorized user to specific systems, specific transactions available on the system and specific times in which a user may access the data of the system. Additionally, the network security system provides a security measure that aborts a transaction if the transaction exceeds a certain duration of time. The duration allotted for a particular transaction is based upon the time in which it takes to generally complete the transaction. By limiting the duration of the transaction between a user computer system and the source computer system to the general transaction time, a computer hacker does not have time to stay on the computer system long enough to analyze or significantly alter applications or corrupt data within the source computer system.

Preferably, many of the authorization functions performed in the network security system are performed in conjunction with tables that specify the users and passwords for the user, the different levels of authorization required for access to systems, transactions, or information protected by the network security system 10. The transaction tables constructed and used according to the present invention enable a security manager of the network security system to easily manage and update access privileges when users change or when computer systems on the network are changed or updated.

The Preferred Operating Environment

Before providing a detailed description of the systems and methods of the present invention, a brief description of the preferred operating environment and the equipment of the operating environment is provided. Referring to FIG. 1, the network security system 10 includes many components that operate to secure transactions and integrate components of one network to another. The network security system 10 ensures that a computer system 16 is authorized to access application servers 20 over a computer network, such as the computer network 22. These security processes or measures taken by the network security system 10 are preferably controlled by the security server 24 in response to a computer system 16 attempting to access the application servers 20 over the open computer network 22 or the internal computer network 26. The open computer network 22 is preferably the computer network commonly referred to by those skilled in the art as the Internet.

The Internet is a network of computers that connects many governmental, university, and private computers together and serves as a means for making a vast quantity of information available to computers connected to the network. Computers, such as computers 16, that have access to a computer network are generally referred to as being "set up" on the computer network. When a device has a connection to the network, the device communicates over the network using an appropriate network protocol, such as Transport Control Protocol/Internet Protocol (TCP/IP), Hypertext Transfer Protocol (HTTP), and generates graphics via Hypertext Mark-up Language (HTML). In general, a personal computer may be set up on the Internet by subscribing to an Internet service provider or other on-line service company that provides a connection to the Internet for the subscribing computer owner. It should be appreciated that information updates and communications within the communication network used in connection with the present invention may be accomplished by a variety of network protocols or languages known by those skilled in the art.

The computer system 16, which alternatively may be any appliance operable to communicate over a network, is connected to an Internet server computer 30. The Internet server computer 30 is connected to the computer network 22 and enables the computer system 16 to communicate via the computer network 22. When an Internet connection is provided by the Internet service provider responsible for the Internet server computer 30, the computer system 16 may seek access to an application server 20 that controls access to applications or objects. Each of the application servers 20 has to an object 21 (e.g. application) that contains the computer programs and data used to process a desired transaction of a user of the computer system 16.

In the preferred operating environment, the computer system 16 first accesses a web server 32 when the computer system 16 desires to communicate with any of the application servers 20. The web server 32 generates HTML data packets to the computer system 16 to display the options available for access to the application servers 20. The web server 32 passes the data messages from the computer system 16 to the security server 24 indicating that the computer system 16 desires to access the application servers 20. The security server 24 then determines whether the computer system 16 is authorized to access any of the application servers 20 and whether the user is authorized to access particular applications or objects that execute on the application servers 20.

Devices that are connected to the Internet utilize addresses to access a particular computer or server on the network. The addresses usually have a specific format such as 10.2.0.52. Each device or workstation connected to a network is assigned a unique code. A standard network address is a 32-bit address field which is broken into two parts. The first part contains the network address; the second part contains the host number. A commonly used notation for Internet host addresses is the dotted-decimal, which divides the 32-bit address into four 8-bit fields. The value of each field is specified as a decimal number, and the fields are separated by periods (for example 010.002.000.052 or 10.2.0.52). Communication between two computers also requires use of ports. A port can be thought of as an endpoint for communication between systems. Each system has over 64,000 ports. Thus, a computer system 16 may access the web server 32 using the address, 10.2.0.52, and using specific port numbers (e.g., port 7171).

Figure 2:
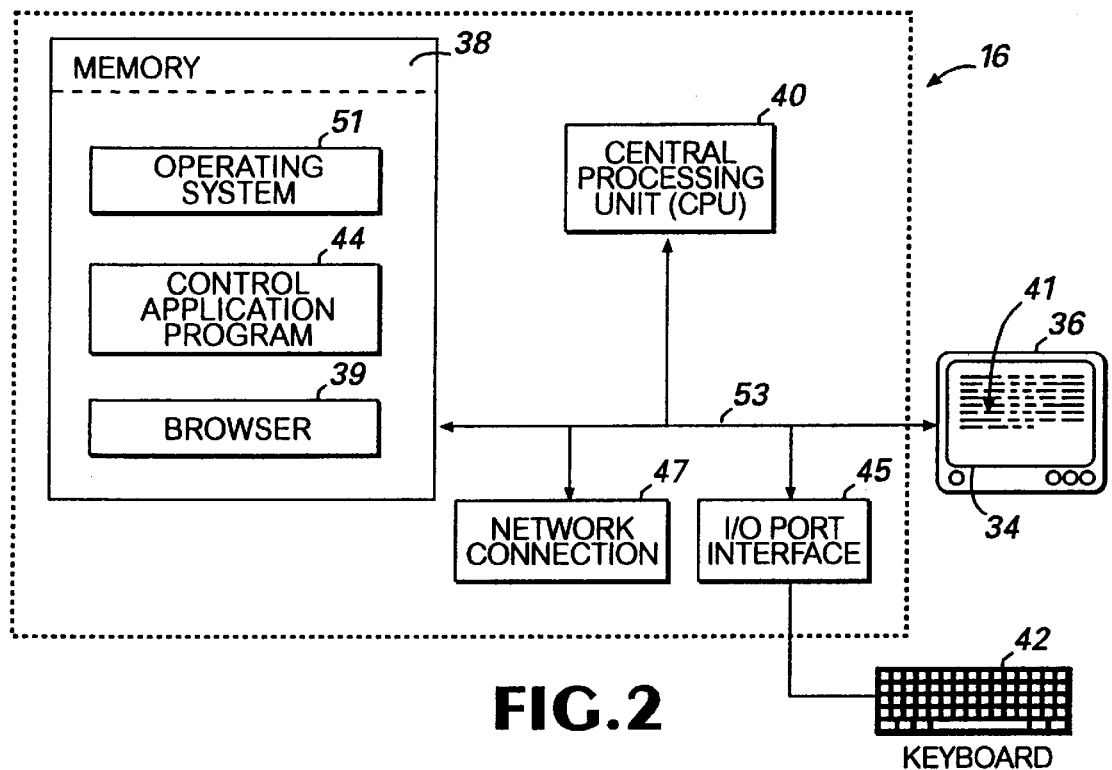
FIG. 2 is a diagram of a customer or user computer system used in connection with the present invention.

Referring to FIG. 2, the general components of a computer system 16 is described. One aspect of the computer system 16 includes a graphical user interface system 41 operating in conjunction with a display screen 34 of the display monitor 36. The graphical user interface system 41 is preferably implemented in conjunction with the operating system for displaying and managing the window objects of the system. It should be appreciated that the interface used with the present invention operates in connection with a "web browser" 39 as commonly known in the art.

Although the present invention is described in conjunction with a conventional desktop computer, it will be appreciated that the present invention may be utilized in other types of computer systems that use a window based display system. The graphical user interface system 41 is implemented as part of the computer system 16 to receive input data from a conventional keyboard 42. Cursor keys on the keyboard 42, a mouse, trackball, or other pointing device may be used to move a cursor on the display monitor 36 for selection of various options.

For simplicity of the drawings, many components of a standard computer system have not been illustrated such as address buffers, memory buffers and other standard control circuits because these elements are well known and illustrated in the prior art and are not necessary for an understanding of the present invention. A computer program used to implement the various processes of the present invention is generally located in the memory unit 38, and the processes of the present invention are carried out through the use of a central processing unit (CPU) 40. Those skilled in the art will appreciate that the memory unit 38 is representative of both read-only memory and random access memory. The CPU 40 is typically implemented as a single-chip microprocessor. The CPU 40, in combination with computer software, such as an operating system 51, an application program 44 (optional), and browser 39 controls the operations of the computer system 16. The operating system software 51, in conjunction with the browser 39 and application program 44 (optional), controls the allocation and usage of hardware and software resources such as memory, CPU time, disk space, and peripheral devices. The bus 53 of the computer system supports communications of control, address, and data signals between the CPU 40 and the remaining components of the computer system 16. The memory unit 38 and the CPU 40 are connected by the bus 53 which is designed to provide an electrical interface between computer system components. The processes implemented by the CPU 40 may be communicated as electrical signals along the bus 53 to an input/output device via input output interface 45. A network connection 47 is provided to connect to a computer network. The network connection may be a modem, LAN connection or other suitable network connection mechanisms. Other computer systems used in connection with the present invention operate in a similar manner but have program modules that vary depending on the function of the component computer system.

Figure 3:
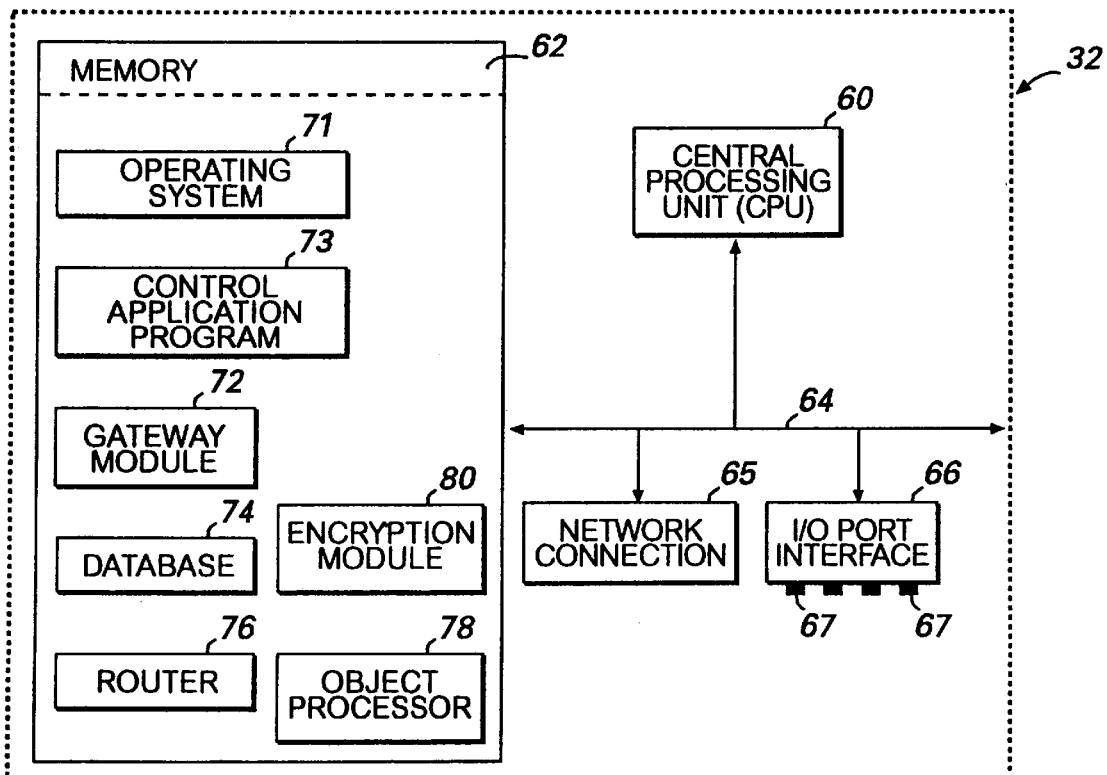
FIG. 3 is a diagram of web server computer system used to handle network transaction traffic between a user computer system and application server computer system as used in connection with the preferred embodiment of the network security system.

Referring to FIG. 3, a description of the web server 32 is described in more detail. The web server 32 includes a central processing unit 60, a memory unit 62, a computer system bus 64, network connection 65, and an I\O port interface 66. The I/O port interface 66 contains a plurality of ports 67 that are used to communicate with external devices, such as an object 21. In a typical implementation, the web server contains over 64,000 ports. The memory unit 62 of the web server 32 contains several program modules including, an operating system 71, a gateway program module 72, a control application 73, and a web server database 74. The gateway program module 72 transfers information received from a computer system 16 and converts the information to a form compatible with the data formats used in the security server 24. The gateway program module 72 returns information to the web server in a format defined by the Common Gateway Interface (CGI) specification. The web server returns this information to a user to indicate to the user, the objects, or applications available to the user at the site accessed by the user. The web server 32 includes a router 76, an object processor 78 and an encryption module 80. The router 76 routes requests for services from user applications of the computer system 16 to the security server 24. As generally discussed above, after the security server 24 authorizes the desired transaction, the gateway program module 72 communicates directly with application servers 20 in order to complete a desired transaction. During the communication with the application server 20, the object processor 78 receives outputs from objects 21. The encryption module 80 encodes and decodes messages transmitted in accordance with the present invention. The encryption module 80 encrypts messages when the web server 32 receives a request from a user of computer system 16. The encryption module 80 encrypts the messages being transferred from the web server 32 to the security server 24 and the application server 20. The encryption module 80 decrypts messages received from the application server.

Figure 4:
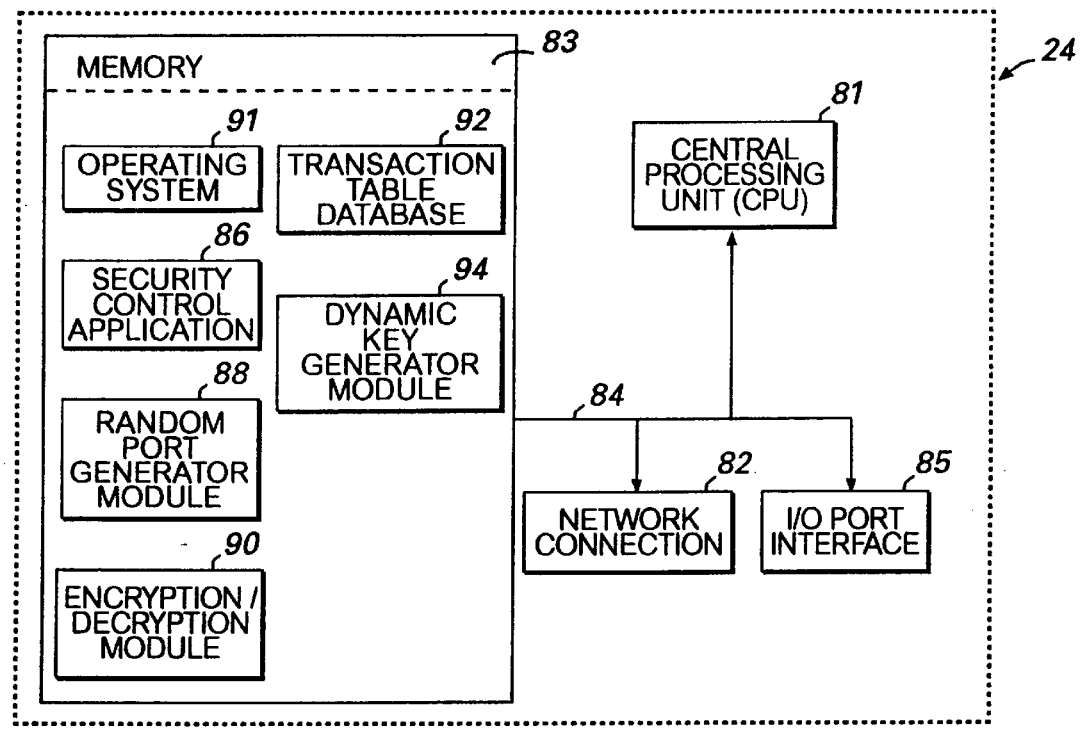
FIG. 4 is a diagram of a security server used in connection with the present invention that operates to control access to an application server computer system.

Referring to FIG. 4, a description of the security server 24 is described in detail. The security server 24 includes a central processing unit 81, a network connection 82, a memory unit 83, a computer system bus 84, and an I\O port interface 85. The security server 24 communicates with external computer systems or devices via the I\O port 85. The security server 24 provides a single point of control for performing the security and administration services of the network security system 10. The memory unit 83 contains a security control application module 86, a random port generator module 88, an encryption module 90, operating system 91, transaction tables 92, and a dynamic key generator module 94. The security control application module 86 manages the coordination of the processes of the various modules implemented at the security server 24. The encryption module 90 decrypts messages delivered to it from the web server 32 and the application server 20 and encrypts messages delivered to the web server 32 and the application server 20. The transaction tables 92 are accessed for each transaction desired by a user. The transaction tables 92 are accessed to determine whether the transaction exists, whether the system on which the transaction resides is active, and whether the user has authority to implement or use the transaction desired by the user. If the user is an authorized user for the transaction, the random port generator module 82 and the dynamic key generator module 94 are activated to generate a random port number and single-use public key, respectively. As known to those skilled in the art, a TCP/IP computer has more than 64,000 ports. The random port generator module 88 randomly selects an unused port for which a communication between an application server 20, within a range defined by the system administrator, and a user computer system 16 is to communicate for this particular transaction. Additionally, the dynamic key generator module 94 generates a random public key to be used by the application server 20 and the web server 32 during communications between the two systems. The transaction specific port and the single-use public key are transmitted in an encrypted message to both the application server 20 and the web server 32, as discussed in more detail below.

Figure 5:
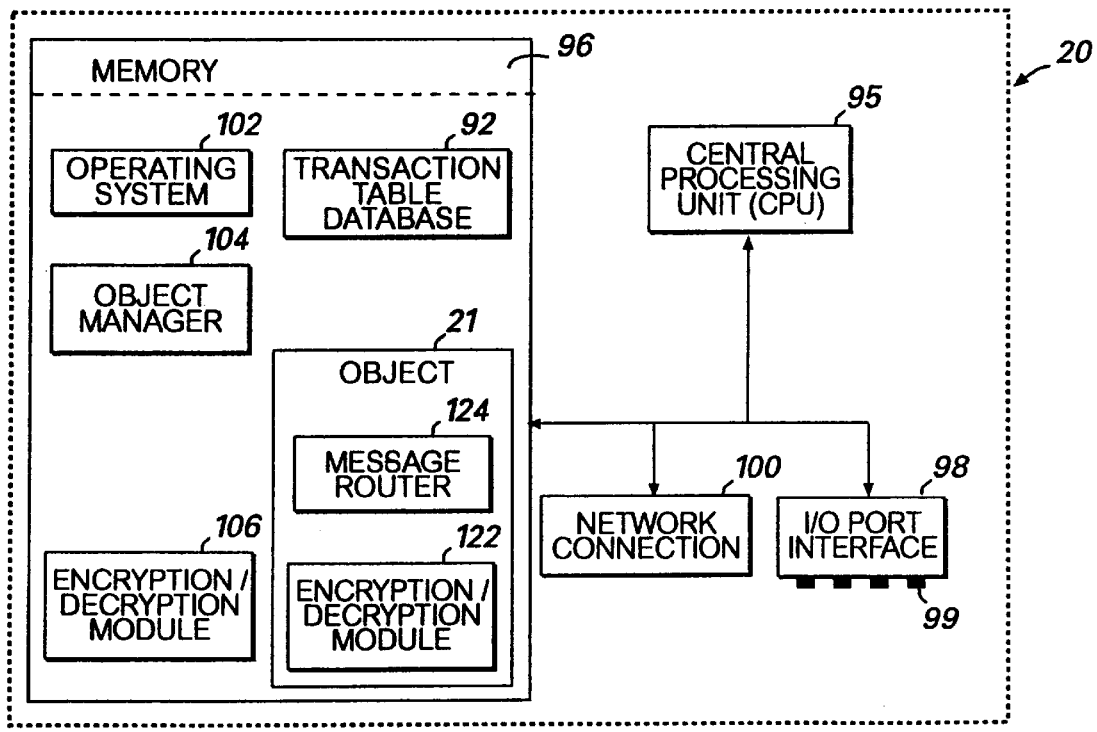
FIG. 5 is a diagram of an application server computer system used in connection with the preferred embodiment of the network security system.

Referring to FIG. 5, the application server 20 used in connection with the present invention is shown in detail. The application server 20 contains a CPU 95, memory unit 96, a computer system bus 97, an I\O port interface 98, and a network connection 100. The I/O port interface 98 includes a plurality of ports 99 that are used to communicate with external devices, such as the web server 32. The memory unit 96 contains various application modules used in connection with the application server 20. The memory unit 96 contains an operating system 102, an object manager program module 104, an encryption program module 106, and objects 21 (one object illustrated). The object manager program module 104 selects and initiates execution of objects 21 of the computer system. The encryption program module 106 encrypts and decrypts messages transmitted to and from the security server 24 in connection with the present invention. The object typically resides on the application server 20. Each object 21 consists of a message router 124, an encryption/decryption module 122, and object application code. The object manager 104 initiates execution of the object application code. The object 21 executes and performs the desired transaction by a user of the computer system 16. The application module is executable code preferably developed by the user organization. It usually is written in the C programming language. The encryption/decryption module 122 encrypts data processed by the object 21 before the message is routed back to the appropriate web server 32 by the message router 124. The message router 124 outputs information via an I/O port that was randomly selected by the security server 24.

Message Protocol

Figure 6:
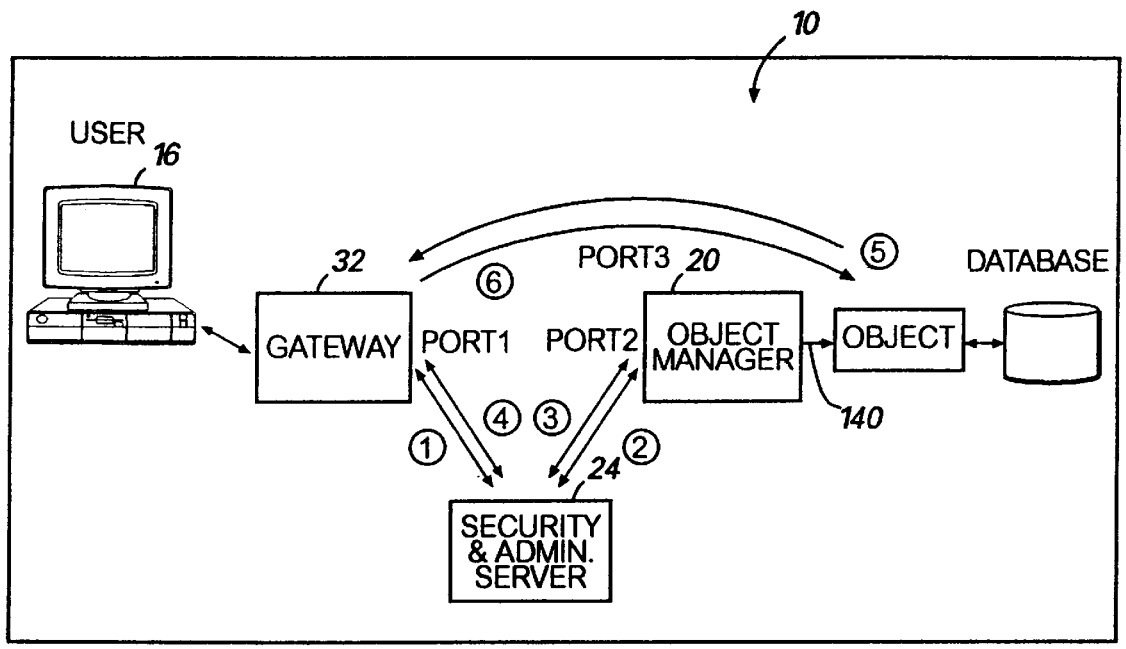
FIG. 6 is a diagram that illustrates the messaging protocol utilized in connection with the present invention.

As discussed above, an advantageous aspect of the network security system 10 is the single point of access control between user computer systems 16 and application servers 20, as well as the messaging protocol used in communication between devices of the network security system 10. Referring to FIG. 6, a messaging protocol as occurring between a single computer system user 16 and an application server 20, is discussed to illustrate the protocol and operations performed in conjunction with the processes of the present invention. When a user of computer system 16 accesses the web server 32, the user may select a desired transaction that is displayed in response to the users access of the web server. When the user selects an object or transaction to be executed, message 1 (messages are represented by encircled numbers) is sent from the web server 32 to the security server 24. The gateway component of the web server 32 is executing a CGI gateway which means that the request was initiated from a web browser or from a JAVA applet. It should be appreciated by those skilled in the art that a computer system user may interface directly with a gateway module that is not part of a web server. The message 1 is encrypted and has located therein a digital signature that is used to authenticate the source of a message and to help ensure data integrity. Digital signatures, or cryptographic checksums, are hashing techniques commonly known to those skilled in the art. When the gateway program module receives the request for a transaction on an application server 20, the only information available at the gateway module is the node address and port that is to be used to address the security server 24.

Several functions are performed by the security server 24 upon receipt of the message 1. The security server 24 first decrypts message 1 then authenticates that message 1 was received from an authorized gateway program module. A digital signature is calculated as known by those skilled in the art and compared to the digital signature in the decrypted message 1. If the encryption program module determines that the digital signatures are equal, gateway authentication is satisfied. After determining that the gateway program module is authorized, the security server 24 determines whether a user is authorized. The security server 24 accesses four transaction tables to determine whether the user of computer system 16 is authorized to access the object identified in the user's request. The tables that are used to verify whether a user is authorized to perform a certain transaction are the user table, object table, node table, and roles table. These tables are searched to determine if a user can access a particular object during a certain time and whether time constraints are imposed on certain nodes. The nodes table provides the node address of the computer system on which the transaction is to be executed.

If the user is authorized to perform the desired task given the constraints defined in the transaction tables, the dynamic key generator module 94 generates a single-use public key to be used for encrypting and decrypting data transmitted between the object and the gateway components of the web server 32. Additionally, the random port generator module 88 implements a randomizing routine to generate a random port number that is to be used for the transmission of information between the object and the gateway component of the web server 32. Generally, a range of acceptable addresses is defined by the system administrator from which the random port number is selected. The security server 24 also assigns a transaction time-out value for the transaction as determined from the object table. After the security server 24 performs each of these functions, the security server 24 sends a message to the object manager 104 of the application server 20.

Message 2 contains information that authorizes the object manager 104 of the application server 20 to perform specific tasks and provides the encryption keys and port addresses to be used for the transmission of data between the object and the gateway components of the web server 32. Additionally, the object manager evaluates the time-out values for the transaction. The application server 20 initiates execution of the requested object and passes certain information to the object as indicated at 140. The information is transmitted to the object using either temporary files, shared memory or message queues. A run-time component of the message protocol is linked with user-written object code. These run time components are the message router 124 and encryption program schedule 124. This run-component uses information from the object manager 24 to control execution of the object and to return output to the gateway program module of the web server 32.

If the time-out value for the transaction is exceeded, the object execution for this transaction is aborted and this event may be logged. As discussed above, by limiting the time of a transaction over the network to a predetermined execution time, the time in which a computer program hacker has to tamper with or corrupt an application or data is very limited. Therefore, the time limit for execution of a transaction provides a further security measure in addition to the single-use public keys and random port selection method.

When the object manager of the application server 20 initiates execution of the object, the object manager sends message 3, asynchronously, back to the security server 24 to confirm to the security server 24 that the object is executing. When the security server 24 receives the message 3, the security server 24 sends message 4 to the gateway program module of the web server 24. Embedded in the encrypted message 4 is the single-use public key generated by the dynamic key program module 94 that is to be used for decrypting data transferred between the gateway program module and the object. The single-use public key is the same key transmitted to the object manager of the application server in message 2. This single-use public key is unique to this particular transaction. For subsequent transactions, another single-use public key is generated for the then occurring transaction.

The message 4 also contains the port number and time-out value assigned to it for the transaction. Sending messages 3 and 4 asynchronously, with the execution of the object, provides enhanced performance characteristics as compared to previously known systems that are implemented over an open network. Conventionally, in open network systems such as the computer network 22, only one step of a multi-step messaging protocol is performed at a time before preceding to the next step. However, the network security system 10 of the present invention enables the transmission of messages 3 & 4 asynchronous with the execution of the object, therefore providing enhanced performance characteristics. Improvements in performance due to use of the asynchronous method of the present invention over a synchronous method can range in time improvements from several milliseconds to several seconds per transaction depending on system and network loads and characteristics.

When the gateway component of the web server 32 receives the message 4, the gateway component prepares the program modules to receive data from the object using information provided in message 4. This information in message 4 is the port number, single-use public key and time-out values. When the object finishes executing the desired transaction, the object transmits message 5 directly to the gateway components of the web server 32. Thus, the security server module is out of the messaging loop at this point of the transaction. When the web server 24 receives a message 5, the web server delivers message 6 back to the object 21 as a confirmation message that the data sent by the object has been received. In the system of the present invention, data sent by the object is blocked to reduce traffic on the network and to improve performance. For example, multiple short records would be combined, or blocked, into a single message to reduce the number of messages on the network. The gateway program then returns the information to the user program either through an application program interface (API) or by a common gateway interface (CGI) program specification.

Transaction tables

Figure 7:
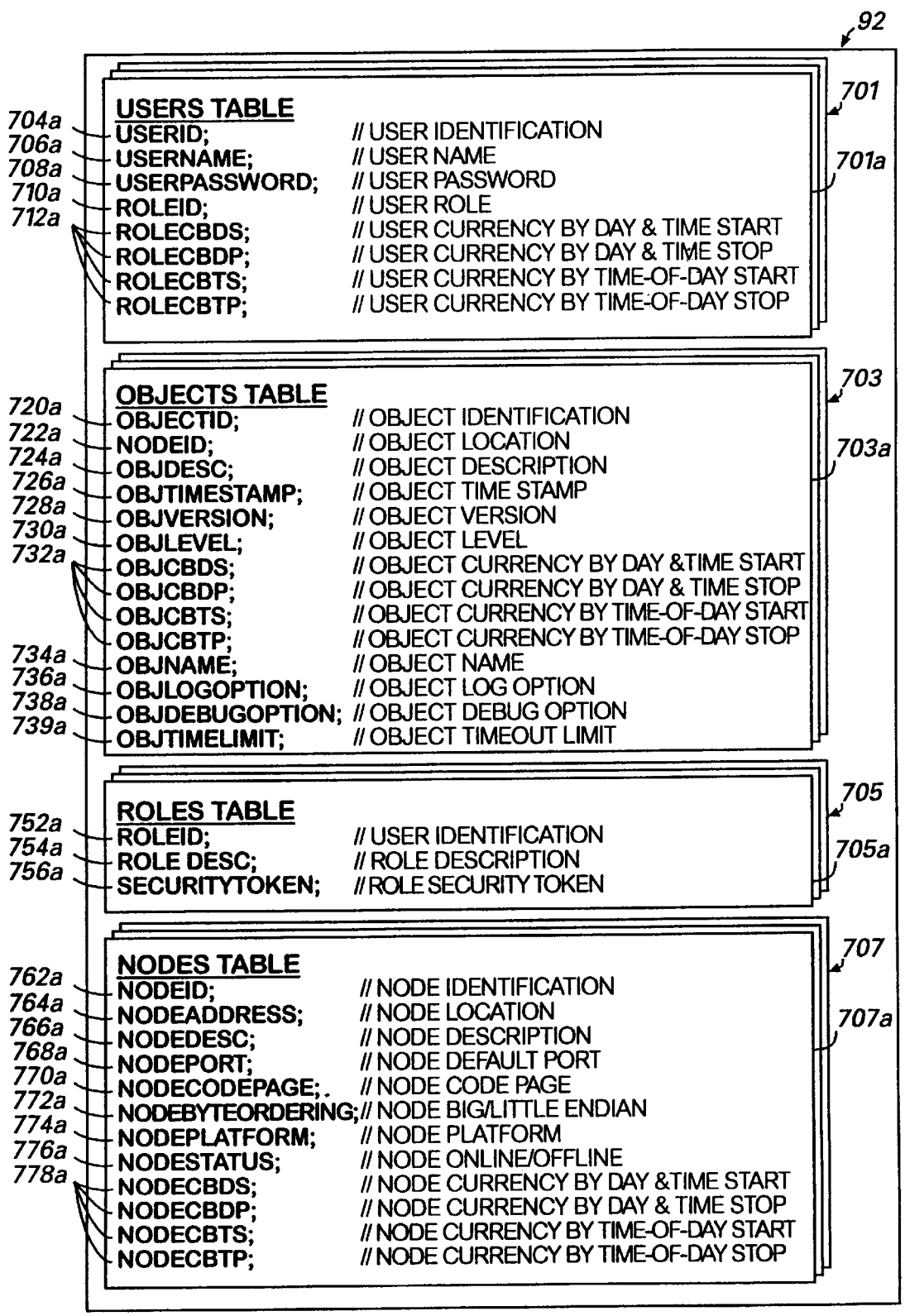
FIG. 7 is a diagram of the transaction tables database used in connection with the present invention.

Referring to FIG. 7, the transaction table database is described in detail. The transaction table database 92 contains the tables that are accessed or used by the security server 24 when determining whether a user is authorized for the transaction that the user seeks at the current time. The transaction table database 92 contains four different types of tables: users tables 701, objects tables 703, roles tables 705, and nodes tables 707. A user's table 701a is representative of the information contained in the individual user's tables and the transaction table database 92. The user table specifies users that have access to one or more application servers 20 which is verified by a user name and password. The user table 701a contains a user identification (ID) field 704a that functions as a key for this table, and contains a user name field 706a that specifies a user's name and has a user password field 708a that specifies the password of the user. If a user enters correct data that satisfies these fields or requirements of one of the tables, the role ID 710a is evaluated. The start and stop times for the role are specified in fields 712a. If a user inputs the correct user name and password contained within the user tables 701, and the request satisfies the time constraints imposed in the users table 701, the security server 24 searches the object's table to determine whether the object which the user desires to access is in one of the object's tables. An object table 703a is representative of the information contained in the object table. The object table 703a contains an object ID field 720a, a node ID field 722a, an object description field 724a, an object time stamp field 726a, an object version field 728a, an object level field 730a, an object currency field 732a, and an object name field 734a, an object option field 736a, and an object time limit field 739a. The object node ID field 722a specifies the node at which the object resides, the object time stamp field 726a specifies the time at which the object was added to the objects table, and the object version field 728a describes the version of the object of the table. The object currency field 732a specifies the times at which an object can be accessed. The object name field 734a specifies the name of the object. The object log option field 736a enables logging of messages associated with a specific object and the object debug option enables a choice of what level of detail to be included in the log for security and debug purposes. The object time-out limit specifies the duration that the object may be accessed by the user during any given transaction.

If the object exists in the objects table 703 and the time constraints imposed on the object is satisfied, a search is made in the role tables 705 associated with the user to verify that the user is authorized to access the object. The role table 705a contains a role ID field 752a. The role ID field 710a in the users table is matched with the role ID field 752a in the role table to determine the role associated with the user. The role table 705a has a role description field 754a, and a security token field 756. The role description field describes the role. For example, the role description field may contain "Read Account Balance." The security token contains an authorization switch for each object authorized for access by the role ID 752a.

If all of the authorization conditions specified in the user table, object table, and role tables are passed, the node tables 707 are accessed. For example, the nodes table 707a contains a node ID field 762a, a node address field 764a, a node description field 766a, a node port field 768a, a node code page field 770a, a node byte ordering field 772a, a node platform field 724a, a node status field 776a, and node currency fields 778a. The node ID field 762a contains the node ID for the specific table. The node address specifies the address of the node identified by the node ID. The node description field describes the node that is to be accessed and the node port field specifies the default port for the node. The node code page field is used to specify the country code page. Code pages are used to define the international languages and special characters that are known to the computer systems. The node byte ordering field specifies the type of translation might be required to map data between computer systems. Some computers record data internally in a format called ASCII, others record information in EBCDIC. The node platform field specifies the platform on which the node resides and the node status field specifies whether the node is on-line or off-line. The node currency field 778a specifies the times at which the particular node may be accessed.

While these transaction tables provide an efficient method for specifying the various operations that a user may perform in a relational manner, the use of the tables as identified above also provides for ease of administration. For example, in large computing environments such as institutional banking environments that are making computer systems available to their customers over the network, a system administrator must update users that are authorized to use the system because the bank acquires new customers each day and also loses customers. Thus, the system administrator must account for these users by updating the records of the bank. Additionally, companies frequently replace existing systems with newer systems and consequently the newer systems or updated systems must be modified or made accessible to the users of the computer system. In prior systems, a system administrator often would have to reprogram or code the new system to be operable with the existing customers and clients on a network. However, utilizing the transaction tables of the present invention, a security administrator may simply access and revise information in the node table and/or objects table to ensure that the new system will operate in conjunction with users that are authorized to use a specific function that was replaced or updated. Thus, the transaction tables as described herein provides a system that is easily manageable.

Message Mapping Between Web Server and Legacy Systems

The network security system 10 is particularly adapted to enable existing computer systems of a company to be integrated in an open network such as the Internet computer network 22 (FIG. 1). The system provides an interface between client programs executing on computers coupled to an open network and computer applications on legacy mainframes/large processing systems. Often these systems are controlled by a UNIX operating system. The client program may be a web browser or other program for communicating messages over an open network in a variety of open network protocols such as HTTP, FTP, e-mail and Telnet. The interface includes a Web server which supports communication in an open network protocol between the Web server and the client program. A gateway module at the Web server converts messages from the client programs to a proprietary data message format. The proprietary data message format is robust enough to support different types of legacy objects such as applications, databases, and other utilities. The object manager maps the message in the proprietary protocol message to an application command or database query which is sent to the legacy object. The response of the legacy object is mapped by the object manager to the proprietary format which may be encrypted by the security module and transmitted to the gateway module. The gateway module converts the response in the proprietary format to the open network protocol for transmission back to a user.

This system provides an interface between users and a legacy system. Because browsers use graphic user interfaces ("GUI"), the users are able to take advantage of the input/output structure of a browser GUI without modification of a legacy object. The system also provides the advantage of using a single message format to support communication between the Web server, security module, and object managers. Such a system extends the useful life of application programs and databases on legacy mainframe systems.

Specifically, the system of the present invention maps from American National Standard Code for Information Interchange (ASCII) to extended binary-coded decimal interchange code (EBCDIC) and vice versa; big Endian byte ordering to little Endian byte ordering and vice versa; and CGI to legacy and legacy to HTTP. The network security system translates information between ASCII and the EBCDIC. This translation is used, for example, if the gateway is executing on an ASCII machine and the object is executing on an EBCDIC machine.

The system of the present invention translates binary control information from big Endian byte ordering (also known as network byte ordering) to little Endian byte ordering (for example, the Intel format). This translation is used, for example, if the gateway is executing on a Motorola or RISC microprocessor and the object is executing on an Intel machine.

If the gateway interfaces to a Web server, the information that the browser passes to the gateway is passed in a specific format as defined by the common gateway interface specification (CGI). Information in the CGI format is translated and transformed into a format that is accessible, useful, and easily manipulated by the legacy application. Also, information returned by the legacy application to the Web server, must be in the HTTP format. Therefore, the system of the present invention maps information received from the Web server to a CGI proprietary format for transmission purposes. The object manager executing on an application server maps the information to a programming interface (GETENV) that is commonly supported on well-known legacy operating systems and defined in ANSI, SAA, POSIX and XPG4 programming specifications. Programming to the HTTP format is accomplished using another programming interface (SPRINTF) which is defined in the ANSI, SAA, POSIX and XPG4 programming specifications. The system of the present invention returns the information to the gateway handling the ASCII to EBCDIC and big to little Endian conversions and blocking and deblocking of data, but does not modify the HTTP format. As indicated in the node byte ordering field 722a of the nodes table 707 (FIG. 7) the messaging format may be specified in the node table.

Transaction Logs

Figure 8:
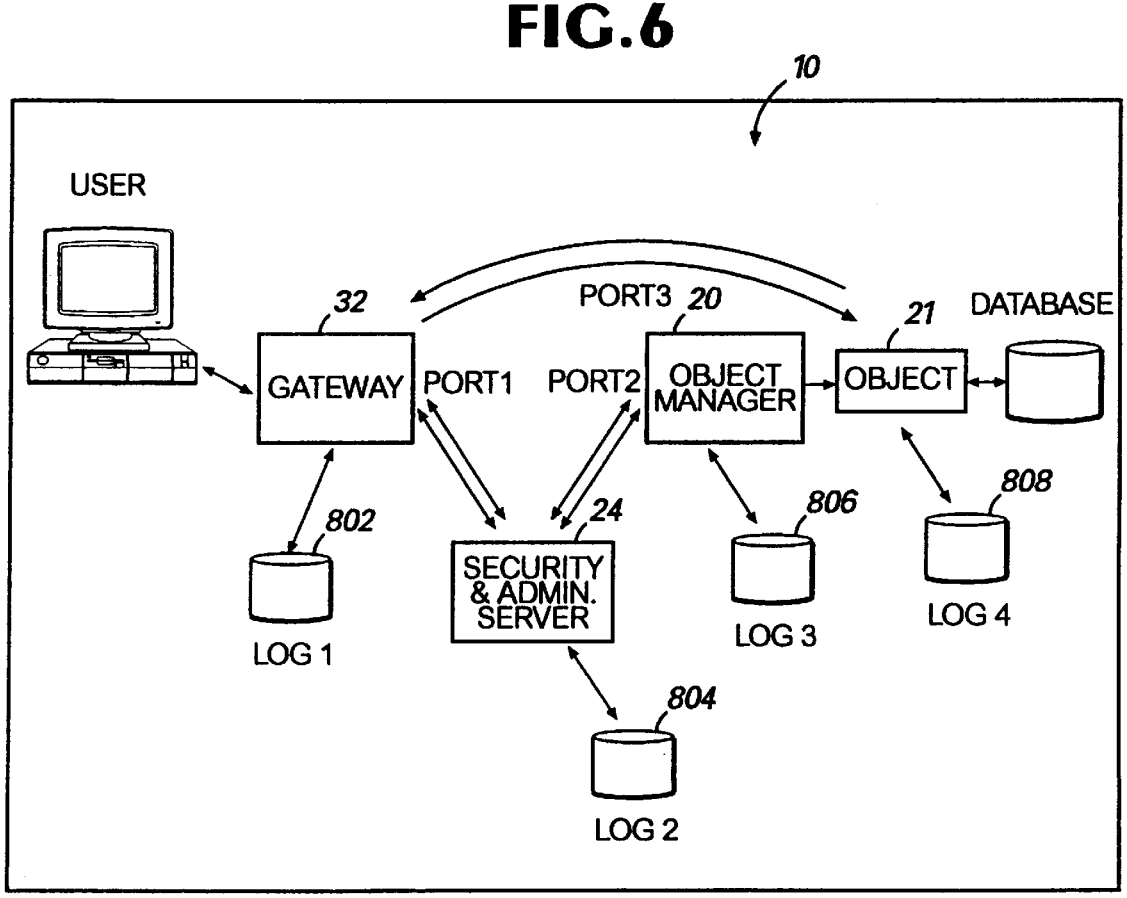
FIG. 8 is a diagram of points within the network security system in which data may be logged.

Referring to FIG. 8, the four points of logging control supported by the network security system 10 as illustrated. Logging information refers to tracking certain information related to the processing of the information or transactions on the network. By logging information at particular points, an administrator operating or monitoring certain aspects of the network security system 10 may determine or observe relevant historical information with regard to the processing of messages and transactions on the network. The network security system 10 provides four points at which information may be logged. The four points at which information may be logged is at the web server 32 indicated by log data 802; the security server 24 indicated by log data 804; at the application server 20 as indicated by log data 806; and at the object 21 as indicated by log data 808. Referring again to FIG. 7, the object table 705 has an object log option field 734a in which a value may be inserted that specifies where data is to be logged on any of the particular systems. For example, the value inserted in this field may specify that the data is to be logged at the web server 32, security server 24, application server 20, or object 21 and further specifies where to log the data at those systems.

Figure 9:
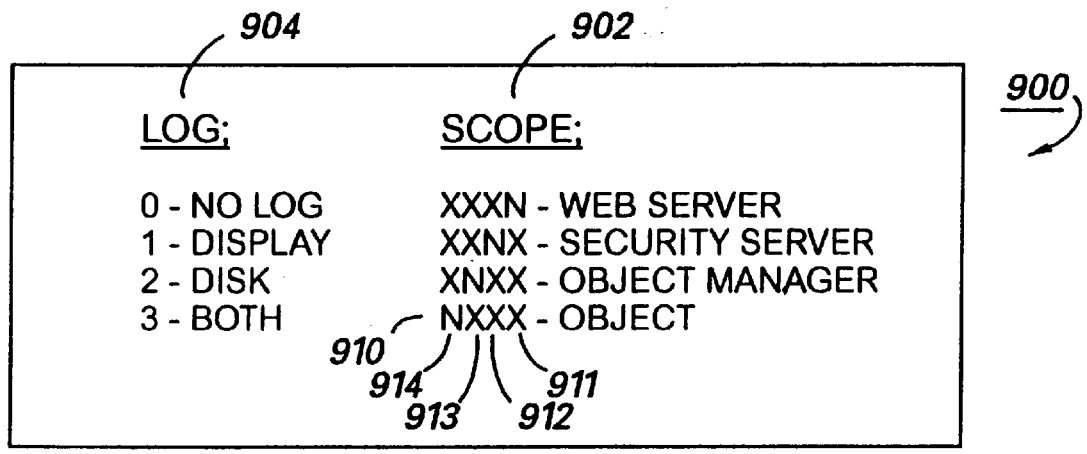
FIG. 9 is a diagram of the data format that indicates which network points are to receive logging data.

Referring to FIG. 9, a table is provided that indicates how the log data is encoded for use with the system of the present invention. The log table 900 has two columns: a "scope" column 902 that specifies the location at which the data should be logged in the system and a log column 904 that specifies where at the location the data is to be logged. The location at which data is to be logged may be indicated by one of four values in a location sequence field 910. The location sequence field 910 has four locations, location 911, location 912, location 913, and location 914. Each of the locations 911, 912, 913, and 914 correspond to one of the specific points within the network security system 10 in which information may be logged. The values specified in the location sequence field 910 determines where to log the information at the particular system. Referring to column 902, the device at which data should be logged at a particular point within the system is indicated. For example, a "0" in any of the log locations 911, 912, 913, or 914 indicates that no log is to be provided for the corresponding system. A value of "1" in a log location indicates that the logging information should be logged to the display of the particular system. A value of "2" in any of the locations indicates that the information should be logged to disks at the location indicated by the position variable. A value of "3" indicated at any of the position variables indicates that the information should be logged to both the display and to the disk. With respect to the position variables, a value in location 911 indicates that the information should be logged at the gateway according to the logging variable; a value in location variable 912 indicates that the information should be logged at the security server 24 according to the logging variable; a value at location variable 913 indicates that the information should be logged at the application server 20 according to the logging variable; and a value in the location variable 914 indicates that the information should be logged at the object according to the position variable specified.

For example, a log option defined as "2222" indicates that the user desires to log information only to disk at the web server 32, the security server 24, the application manager 20, and the object 21. A log option of "3011" indicates that information at the object level is to be logged to both the disk and the display; information at the application server level should not be logged; and that information at the web server 32 and the security server 24 should be logged only to the display.

Figure 10:
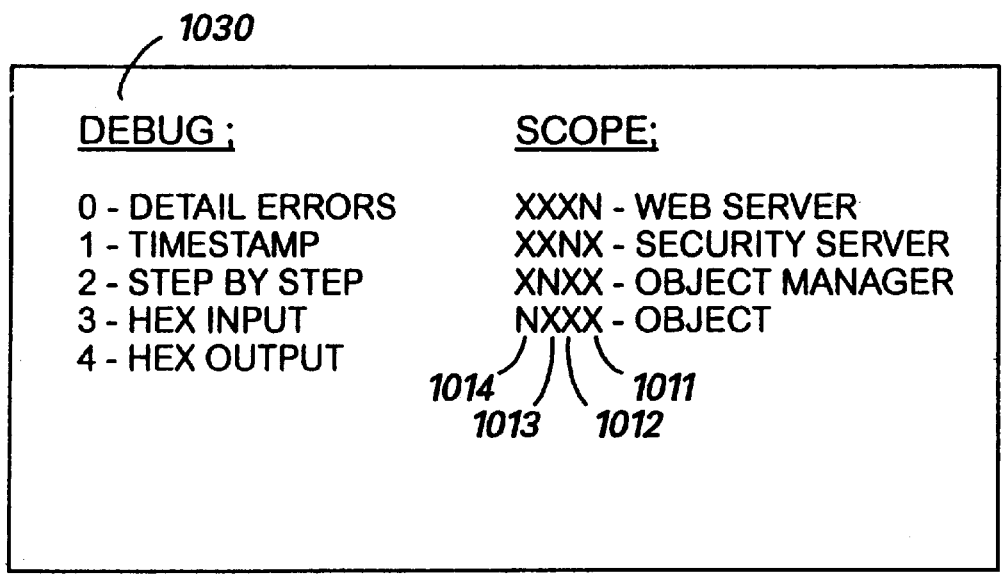
FIG. 10 is a diagram of the data format that indicates where to log data at the network points.

Referring to FIG. 10, the table 1000 indicates what information should be logged at the locations indicated by the information of table 9. Referring also to table 7, the object table 905 has a field labeled "object debug option 736a" which specifies what should be logged. The position variables 1011, 1012, 1013, and 1014 correspond to the web server 32, security server 24, application server 20, and object, respectively, as discussed in connection with FIG. 9. Table 1000 also has debug values 1030 which specify what should be logged at the particular position specified by the position variables 1002. A value of "0" indicates that detail errors are not to be logged. A value of "1" indicates that a time stamp, or time at which the message passed through the system should be included. A value of "2" indicates that data is to be logged at a step by step level (i.e., at selected checkpoints within the web server 32, security server 24, application server 20 and object). A value of "3" indicates that all input messages should be logged in hex format. A value of "4" indicates that all output messages should be logged in hex format.

For example, a debug option of "2222" specified in the object table 705 at the debug option field 736a having a value of "2222" specifies a certain logging level. Specifically, the value of "2222" in the debug option field 736a (FIG. 7) indicates that logging should occur at a step by step level at the web server 32, security server 24, the application server 20, and the object 21. A value of "0314" in the debug option field 736a of the objects table indicates that no errors are to be logged at the object level; input messages should be logged in hex format at the application server, a time stamp should be logged at the security server and output messages should be logged in hex format at the Web server 32.

This system of logging is very advantageous. Because all logging parameters are defined at the object level, the system administrator can select in a relatively easy manner a very detailed logging for security sensitive transactions. Additionally, using the logging method specified, a system administrator may specify a very detailed level of information to be recorded for debugging purposes.

Message Formats

Referring to FIG. 11, a table 1100 shows the formats of the messages delivered between systems of the network security system 10. Table 1100 shows the various fields that may be included and messages delivered according to the messaging protocol of the present invention. Table 1100 also includes sample data that may be included in a field and indicates what information is included in the particular messages as delivered according to the system of the present invention. While many fields are available for use, not all fields are relevant or used in each transaction between systems of the network security system 10. The selected fields included in various messages include FromNode field 1104, a FromTime field 1106, a FromCodePage field 1108, a FromByteOrdering field 1110, a FromPlatform field 1112, a FromDataMode field 1114, a Password field 1116, a LogOption field 1118, a DebugOption field 1120, a UserName field 1122, a UserPassword field 1124, a UserID field 1126, a Sequence number field 1128, an Object field 1130, a PublicKey 1132, a TargetSocket field 1134, a TargetAddress field 1136, a ReturnCode field 1138, a GatewayData field 1140, an ObjectData field 1142, and an EndData field 1144. A GatewayData field 1140 contains information specific to the Web server. The ObjectData field contains information supplied by the browser 39 and End of Data or End of Record codes. The target socket field contains the node number used by the web server 32 to communicate with the security server 24. Return codes of ReturnCode field 1138 are used to communicate error conditions.

The FromCodePage field 1108 specifies whether ASCII or EDCBIC is used as discussed above. The ByteOrdering field 1110 specifies whether the big or little Endian should be used as specified above. The messages column 1107 indicates which fields are included in which messages. A numbers in the message column of FIG. 11 in association with a particular field indicates that that field is included within the message specified in the column and the number associated with the "end" field indicates the total number of fields included in each message.

Processes of Present Invention Referring to FIGS. 12a, 12b, 12c, 12d and 12e, the processes implemented in the preferred embodiment of the present invention are described. At step 1202, if the Gateway component is executing as a CGI Gateway to a web server, the user's request is initiated from a web browser or from a JAVA applet. After a user has invoked a web browser or JAVA applet, the user enters the address of the web sever at step 1204 which initiates access to the computer systems of the present invention. At step 1206, the transactions or object options for selection are presented to a user. The process then proceeds to step 1208 where a user enters a user name and password. The user name and password could also be provided by the JAVA applet or HTML code. The user may then activate or request that an object for transaction be executed at step 1212. At step 1214, the web server 32 determines that the information input should be passed to the security server 24. Before sending a message to the web server 24 that includes the information input by the user, the web server 32 encrypts, at step 1216, the message and includes a digital signature in the message for authentication and data integrity purposes. It should be appreciated that a variety of encryption methods as known by those skilled in the art may be used such as DES, Triple DES, DESX, RC2, RC4, RC5, IDEA, or RSA. The web server 32 then sends at step 1218 the encrypted message to the security server 24.

Figure 12A:
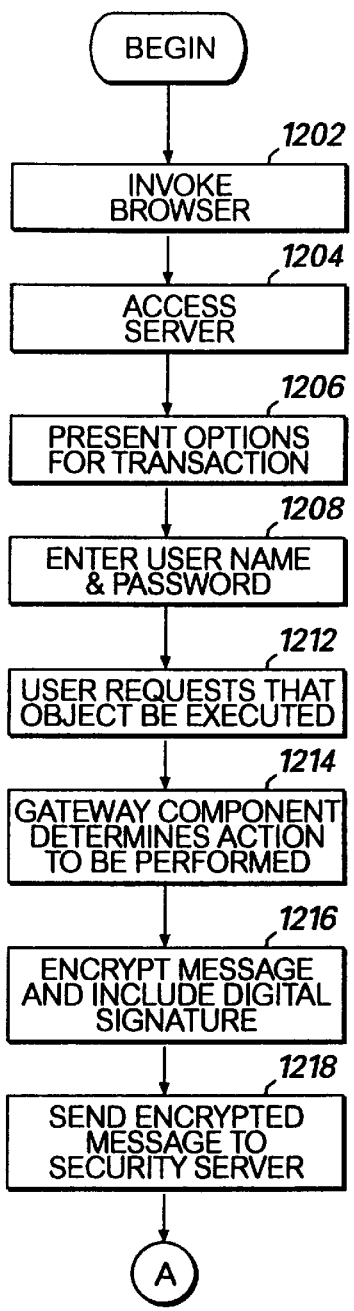
Figure 12B:
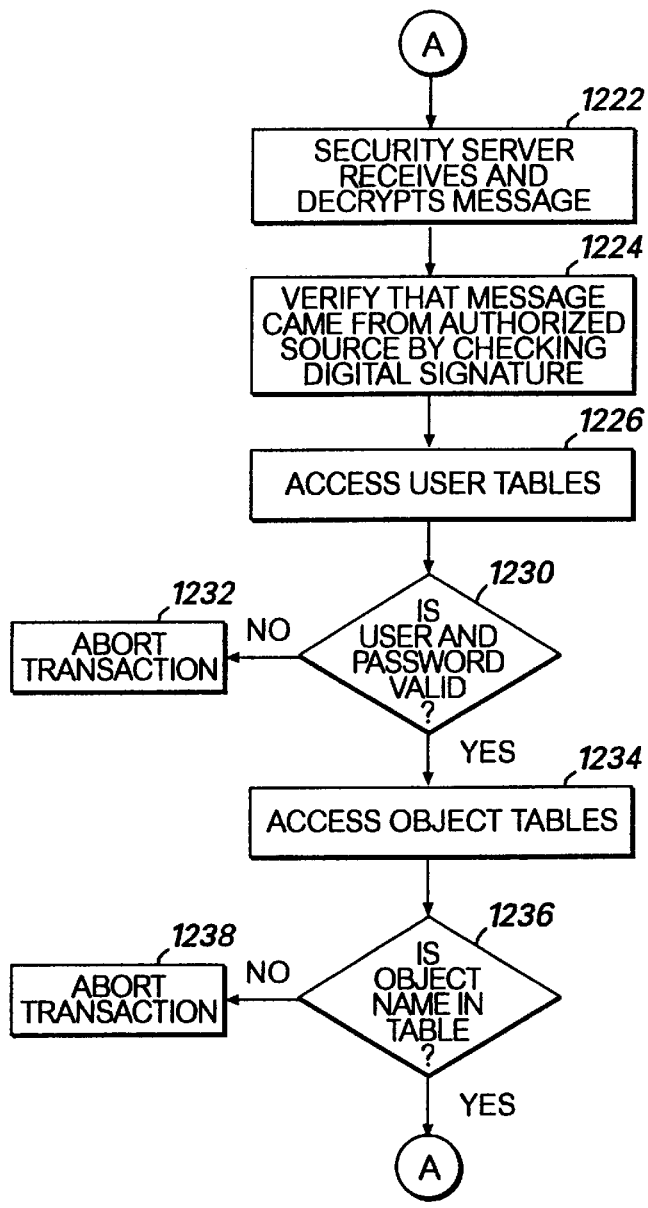
Figure 12C:
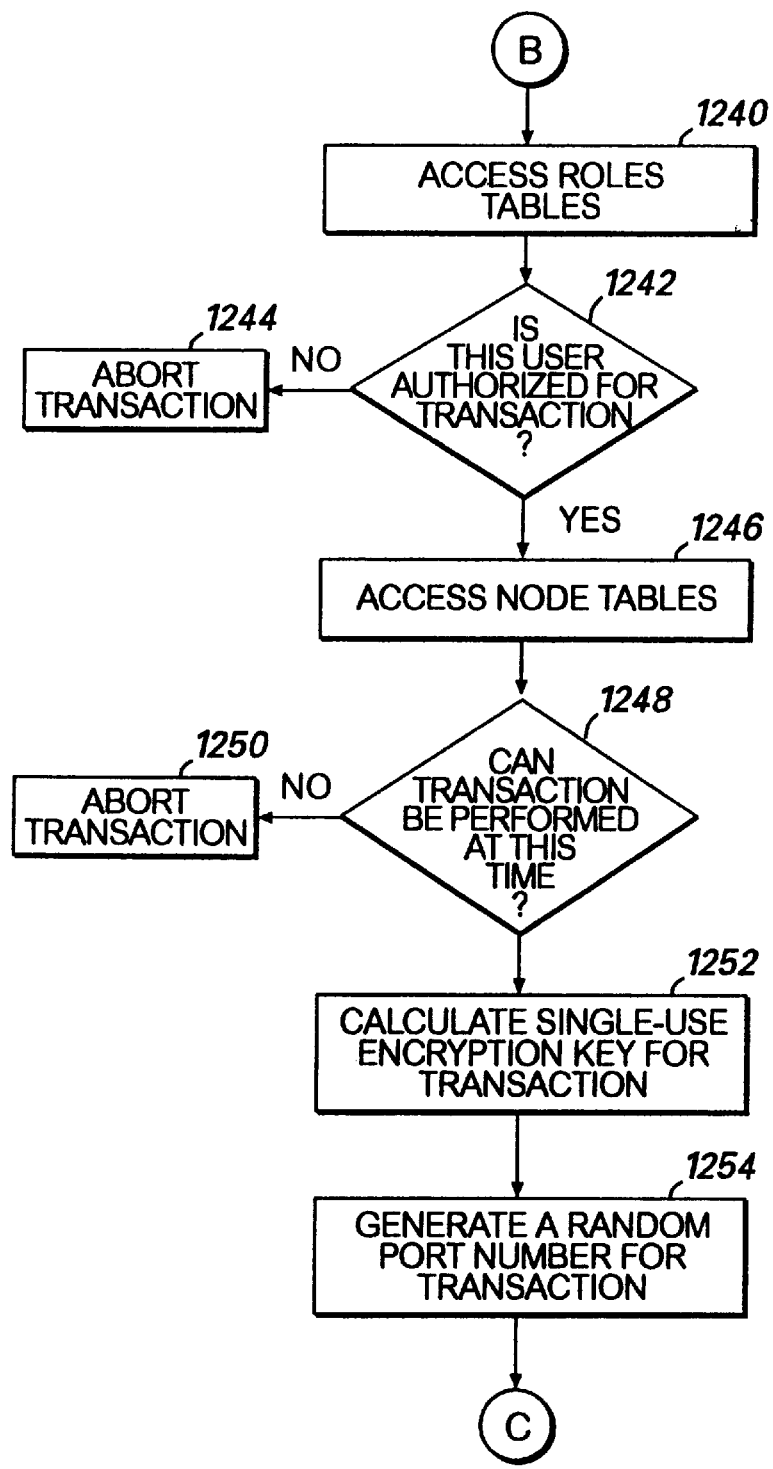

Referring to FIG. 12b, the processes occurring at the security server 24 are described. At step 1222, a security server receives and decrypts the message sent from the web server 24. At step 1224, the security server 24 checks whether the message came from an appropriate source by verifying that the digital signature is correct. The process then proceeds to step 1226 where the authorization check for the user transactions begin. At step 1226, the user tables stored in the transaction tables database are accessed. The process then proceeds to step 1230 where a determination is made whether the user has entered an authorized user name and valid password. If at step 1230, the user did not enter a valid user name or valid password, the process proceeds to step 1232 where the transaction is aborted. If the user did enter a valid user name and valid password, the process proceeds to step 1234. At step 1234, the object tables are accessed to determine whether the object or transaction selected by the user is available. At step 1236, the process determines if the object name is in the object table. If the object name is not in the object table, the process proceeds to step 1238 where the transaction is aborted.

If, however, the object is in the object table, the process proceeds to step 1240 (FIG. 12c) where the roles tables are accessed to determine whether the user is authorized to access this object to perform the transaction. At step 1242, the process determines whether the user is authorized to do the transaction indicated as determined from the roles tables. If the user is not authorized to perform the specific transaction, the process proceeds to step 1244 where the transaction is aborted. If, however, at step 1242, the user is authorized to perform the transaction, the process proceeds to step 1246 where the nodes tables are accessed. At step 1248, the process determines whether the node designated for the transaction is available and may be accessed during the current time period. If the node is not available to be accessed during the current time period, the process proceeds to step 1250 where the transaction is aborted.

If, however, the node may be accessed during the current time, the process proceeds to step 1252. At step 1252, a public encryption key is generated for this particular transaction. At step 1254, a port number is randomly generated from the available ports. The port number generated from this randomizing routine is used as the port on which communications are to occur between an object and a web server. The process then proceeds to step 1256 (FIG. 12d) where communication set-up data is delivered. At step 1256, the security server 54 sends a transaction information, the public key for this transaction, the random port number for this transaction, and the duration value for the transaction to the object manager of the application server. The process then proceeds to step 1257 where the object manager may initiate execution of the object. At step 1258, the object manager of the application server notifies the security server 24 that the object has begun execution.

At step 1260, a security server 24 additionally sends a new public key, the port number, and the random node location to the web server 32. By generating a new public key for each transaction and separately sending these keys to the two systems that are to communicate, the security system 10 of the present invention provides a security protocol that is difficult for a computer hacker to break.

At step 1262, the current object execution time for the transaction is compared against the time limit for the transaction. If the current duration for the transaction exceeds the time-out period at step 1266, the process proceeds to step 1268 where the transaction is aborted. However, if at step 1266, the transaction duration has not exceeded the time-out value, the process proceeds to step 1270a. At step 1270a, a parallel process is initiated: at step 1270b a time monitor is initiated to monitor the execution time of the object and at step 1271 a program routine waits for completion of the execution of the object. If the actual execution time of the object exceeds the time-out value, the process proceeds to step 1268 where the transition is aborted. In parallel with process 1270b, the system proceeds to step 1271 and waits for the object to complete execution. The line 1259 indicates that the process waits on a response from the object when the object begins execution. When the object completes execution and provides the needed information, the process proceeds to step 1272 (FIG. 12e). When the object has finished executing, the object encrypts, at step 1272, the data message with the private key for this transaction. At step 1274, the object outputs the transaction response on the random port supplied by the security server so that the object response is available to the Web server. The process then proceeds to step 1276. The gateway of the web server may then listen on the port supplied by the security server for this particular transaction. The executed transaction is displayed to the user at step 1278. The process then ends at step 1280.

The foregoing relates to the preferred embodiment of the present invention, and many changes may be made therein without departing from the scope of the invention as defined by the following claims.

What is claimed is:

1. A method for providing a first computer with secure access to a destination computer, comprising the steps of:

receiving a first message from the first computer at a gateway requesting a function to be executed by the destination computer;

directing the first message from the gateway to a security server;

determining whether the requested function is permitted;

if the requested function is permitted, transmitting a second message from the security server to the destination computer authorizing execution of the function;

initiating execution of the function at the destination computer; and while the function executes, asynchronously transmitting a third message from the destination computer to the security server confirming initiation of the execution of the function.

2. The method of claim 1 further comprising the step of:

transmitting a fourth message from the security server to the gateway while the function executes.

3. The method of claim 2 further comprising the steps of:

randomly selecting a communications port from a plurality of unused communications ports available at the gateway;

including a value representing the selected communications port in the second message transmitted from the security server to the destination computer;

including the value representing the selected communications port in the fourth message transmitted from the security server to the gateway;

preparing the gateway to receive communications from the destination computer on the selected communications port; and after the function has finished executing, transmitting a fifth message from the destination computer to the selected communications port of the gateway, the fifth message including a response associated with the executed function.

4. The method of claim 2 further comprising the steps of:

allotting a predetermined function execution time;

including a value representing the predetermined function execution time in the second message transmitted from the security server to the destination computer; and terminating execution of the function if the time to execute the function exceeds the predetermined function execution time.

5. The method of claim 4 further comprising the step of logging the termination of the execution of the function in a log maintained at the security server.

6. The method of claim 4 further comprising the step of including the value representing the predetermined function execution time in the fourth message transmitted from the security server to the gateway.

7. The method of claim 2 further comprising the steps of:

dynamically creating a single-use encryption key;

transmitting the single-use encryption key in the second message transmitted from the security server to the destination computer;

transmitting the single-use encryption key in the fourth message transmitted from the security server to the gateway;

encrypting a fifth message with the single-use encryption key at the destination computer, the fifth message including a response associated with the executed function; and decrypting the fifth message at the gateway using the single-use encryption key.

8. The method of claim 1, wherein the step of determining whether the requested function is permitted comprises one or more of the steps selected from the group including:

accessing a first table to determine whether the user has input identification information contained in the first table;

accessing a second table to determine whether the user is authorized access to an indicated program module of the destination computer;

accessing a third table to determine whether the user has access privileges for the requested function;

accessing a fourth table to obtain a physical address associated with the destination computer; and determining whether the requested function has been requested during a time when the destination computer is available for performing the requested function.

9. The method of claim 1, wherein the first message is encrypted and contains a digital signature to authenticate the first message was received from an authorized first computer, further comprising the steps of:

decrypting the first message;

receiving the digital signature in the first message; and authenticating the first message by calculating a digital signature associated with the first message and comparing the calculated digital signature to the received digital signature.

10. The method of claim 1, wherein the step of executing the function comprises executing an object or completing a transaction.

11. An apparatus configured to perform the method of claim 1.

12. A computer storage medium, or a group of computer storage media, comprising computer-executable instructions for performing the method of claim 1.

13. A method for providing a first computer with secure access to a destination computer, comprising the steps of:

receiving a first message from the first computer at a gateway requesting a function to be executed by the destination computer;

directing the first message from the gateway to a security server;

determining whether the requested function is permitted;

if the requested function is permitted, transmitting a second message from the security server to the destination computer authorizing execution of the function;

initiating execution of the function at the destination computer;

allotting a predetermined function execution time;

including a value representing the predetermined function execution time in the second message transmitted from the security server to the destination computer;

terminating execution of the function if the time to execute the function exceeds the predetermined function with execution of time while the function executes, asynchronously transmitting a third message from the destination computer to the security server confirming initiation of the execution of the function.

14. The method of claim 13 further comprising the steps of:

while the function executes, asynchronously transmitting a fourth message from the security server to the gateway;

dynamically creating a single-use encryption key;

transmitting the single-use encryption key in the second message transmitted from the security server to the destination computer;

transmitting the single-use encryption key in the fourth message transmitted from the security server to the gateway;

encrypting a fifth message with the single-use encryption key at the destination computer, the fifth message including a response associated with the executed function;

after the function has finished executing, transmitting the fifth message from the destination computer to the selected communications port of the gateway, the fifth message including a response associated with the executed function; and decrypting the fifth message at the gateway using the single-use encryption key.

15. The method of claim 14, wherein the step of determining whether the requested function is permitted comprises one or more of the steps selected from the group including:

accessing a first table to determine whether the user has input identification information contained in the first table;

accessing a second table to determine whether the user is authorized access to an indicated program module of the destination computer;

accessing a third table to determine whether the user has access privileges for the requested function;

accessing a fourth table to obtain a physical address associated with the destination computer; and determining whether the requested function has been requested during a time when the destination computer is available for performing the requested function.

16. An apparatus configured to perform the method of claim 14.

17. A computer storage medium, or a group of computer storage media, comprising computer-executable instructions for performing the method of claim 14.

18. A method for providing a first computer with secure access to a destination computer, comprising the steps of:

receiving a first message from the first computer at a gateway requesting a function to be executed by the destination computer;

directing the first message from the gateway to a security server;

determining whether the requested function is permitted;

if the requested function is permitted:
   dynamically creating a single-use encryption key,
   transmitting a second message from the security server to the destination computer authorizing execution of the function, and
   including the single-use encryption key in the second message;

initiating execution of the function at the destination computer;

while the function executes:
   asynchronously transmitting a third message from the destination computer to the security server confirming initiation of the execution of the function,
   asynchronously transmitting a fourth message from the security server to the gateway, and
   including the single-use encryption key in the fourth message; and after the function has finished executing:
   encrypting a fifth message with the single-use encryption key at the destination computer, the fifth message including a response associated with the executed function,
   transmitting the fifth message from the destination computer to the selected communications port of the gateway, the fifth message including a response associated with the executed function, and
   decrypting the fifth message at the gateway using the single-use encryption key.

19. An apparatus configured to perform the method of claim 18.

20. A computer storage medium, or a group of computer storage media, comprising computer-executable instructions for performing the method of claim 18.

* * * * *